Patented Aug. 1, 1933

1,920,384

UNITED STATES PATENT OFFICE 1,920,384

STOVE WICK AND ITS COMPOSITION

Adolph A. Halter, Cleveland, Ohio

No Drawing. Application June 2, 1932
Serial No. 615,035

2 Claims. (Cl. 67—69)

This invention relates to a lamp or stove wick for oil and gasoline stoves or the like and to the composition for making the same.

It is particularly aimed to provide a wick which will have the required hardness and also possess the requisite porosity.

In making the wick, I use ground pumice or whiting, four parts; charcoal, one part; coke, one part; sand, one part; grit, one part; resin, one-eighth part; red lead, one-twentieth part; silicate of soda; and water.

It is to be noted that whiting is an equivalent of pumice, and that carbonate of lime or cellulose are equivalents of resin.

All of the materials with the exception of the silicate of soda and water are preferably first thoroughly mixed after which the silicate of soda and the water are added and mixed therewith so that a paste is produced which is formed into the desired shape for the wick, which is then burnt until vitrified.

The proportions of the silicate of soda and water are as follows:

I take a saturated solution of silicate of soda in water commonly known as "water glass" and mix therewith water in the proportions of two parts of the water glass to one part of water and use sufficient of said solution with the other ingredients, hereinbefore referred to, to make a paste of a density that may be molded into the desired form.

The silicate of soda, water, and pumice coact in producing a paste which hardens the wick, while the charcoal and coke cause the wick to burn or ignite when the oil gets in its pores. The sand, grit, resin and red lead, when burnt make the wick porous.

Various changes may be resorted to, especially by way of equivalents, within the spirit and scope of the invention.

I claim as my invention:—

1. A wick for the purpose specified made of pumice four parts, charcoal one part, coke one part, sand one part, grit one part, resin one-eighth part, silicate of soda and water mixed into a paste, then dried, and then vitrified by heat.

2. A composition to produce a wick upon admixture with silicate of soda and water consisting of pumice four parts, charcoal one part, coke one part, sand one part, grit one part, resin one-eighth part, red lead one-twentieth part.

ADOLPH A. HALTER.